June 27, 1967   W. F. MANNING   3,327,667
MOORED PRODUCTION-STORAGE TANK
Filed April 28, 1965   6 Sheets-Sheet 1
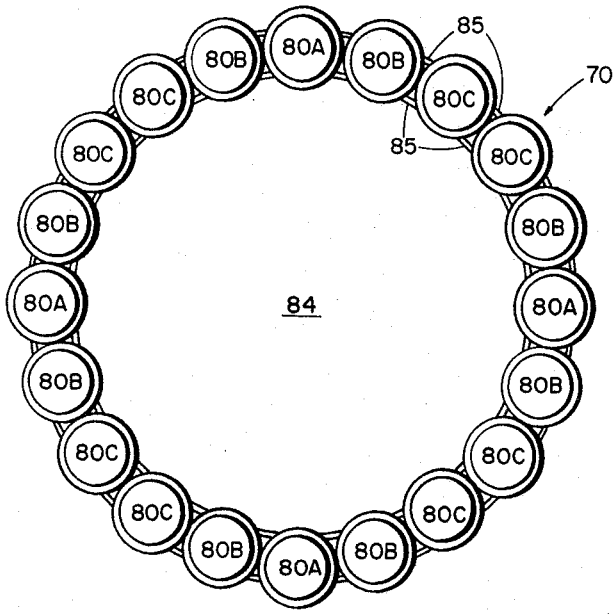
FIG XII
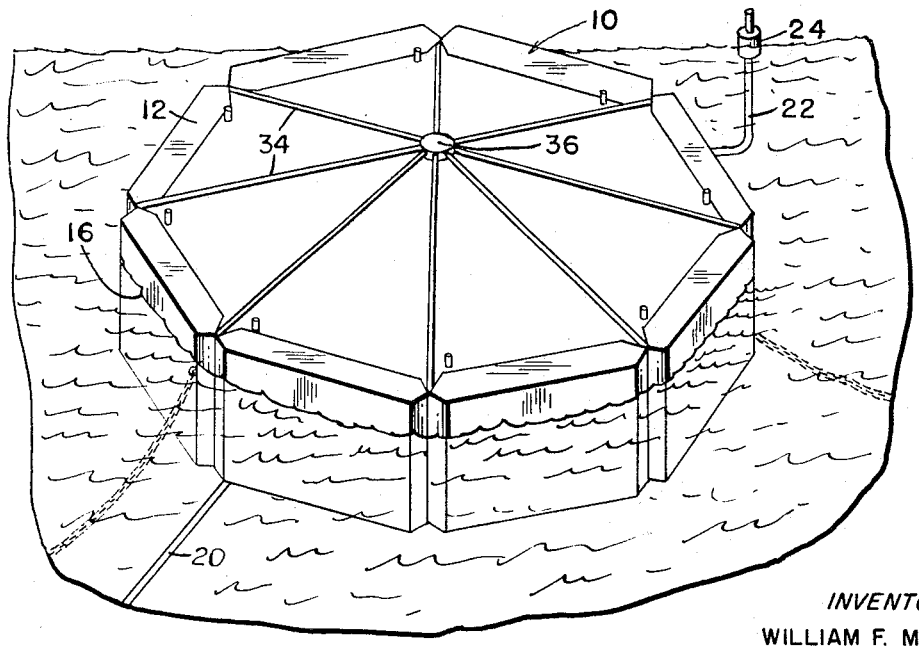
FIG I
INVENTOR.
WILLIAM F. MANNING
ALAN PAUL
ATTORNEY June 27, 1967  W. F. MANNING  3,327,667
MOORED PRODUCTION-STORAGE TANK
Filed April 28, 1965  6 Sheets-Sheet 2
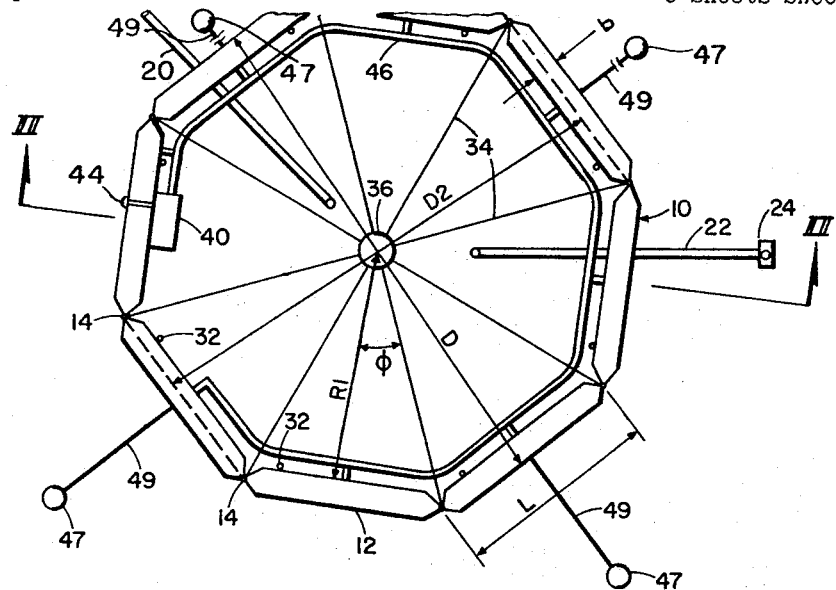
FIG IA
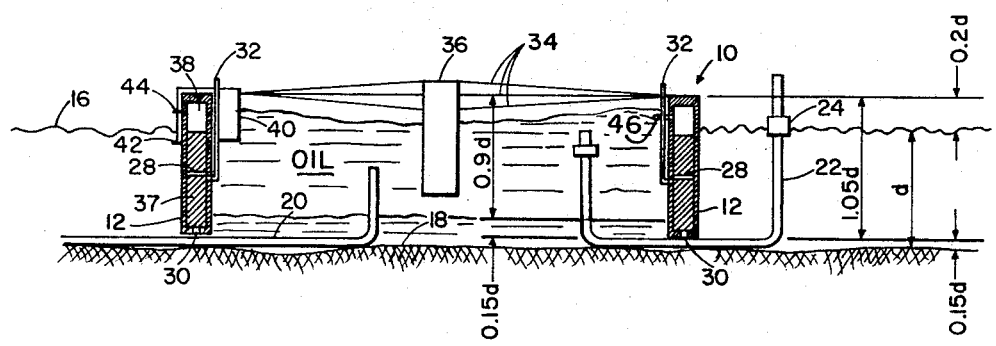
FIG III
INVENTOR.
WILLIAM F. MANNING
ALAN PAUL
ATTORNEY.

June 27, 1967  W. F. MANNING  3,327,667
MOORED PRODUCTION-STORAGE TANK
Filed April 28, 1965  6 Sheets-Sheet 3
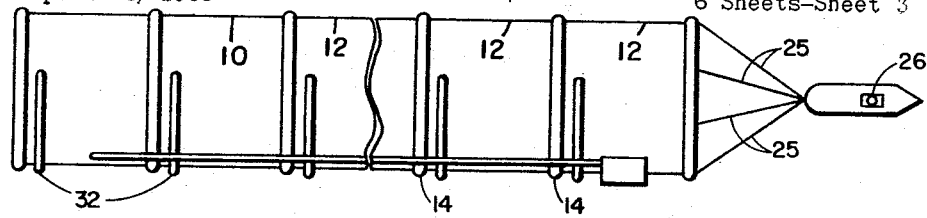
FIG III
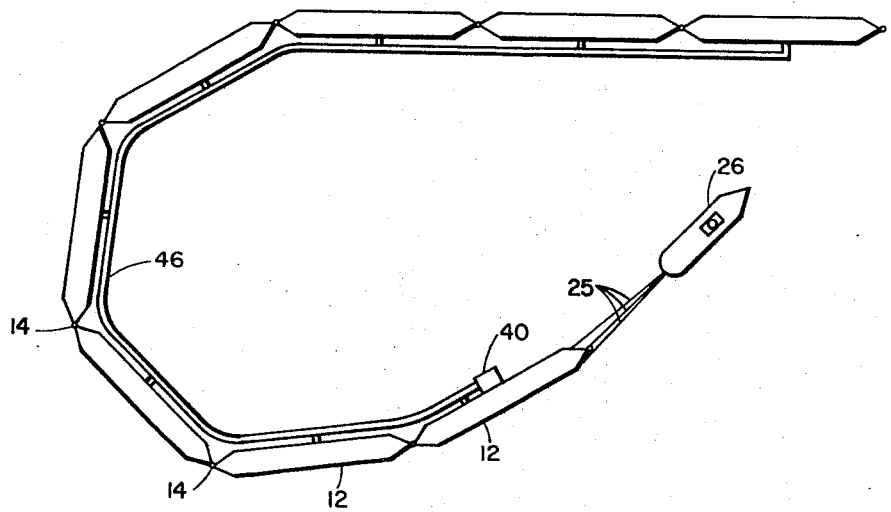
FIG IV
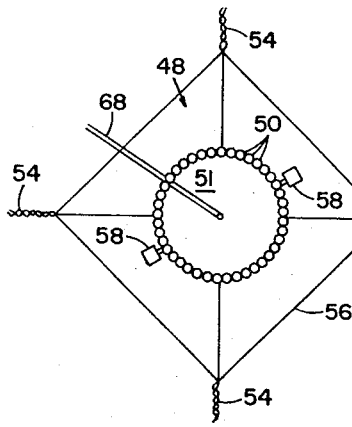
FIG V
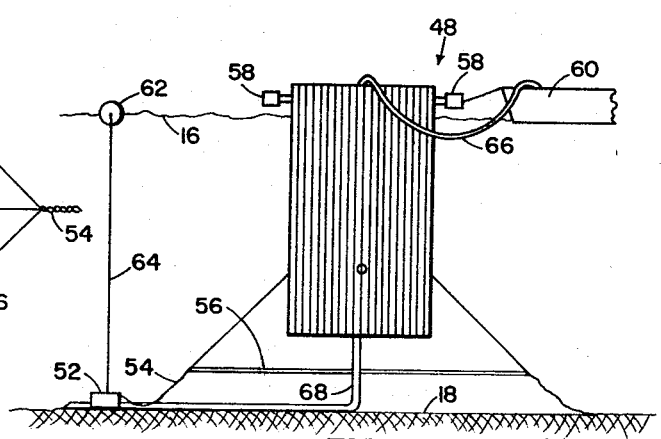
FIG VI
INVENTOR.
WILLIAM F. MANNING
ALAN PAUL
ATTORNEY.

June 27, 1967     W. F. MANNING     3,327,667
MOORED PRODUCTION-STORAGE TANK
Filed April 28, 1965     6 Sheets-Sheet 4
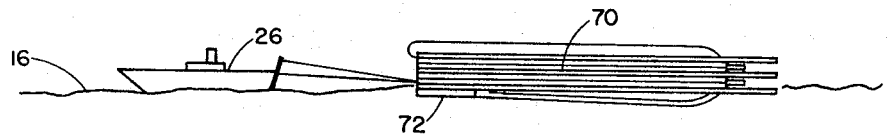
FIG VII
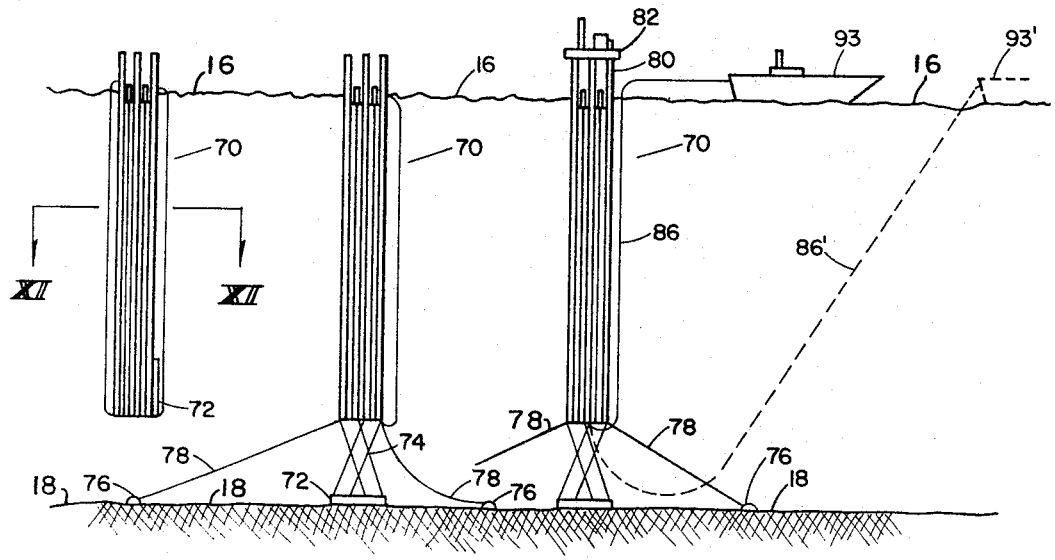
FIG VIII     FIG IX     FIG X
*INVENTOR.*
WILLIAM F. MANNING
ALAN PAUL
*ATTORNEY.*

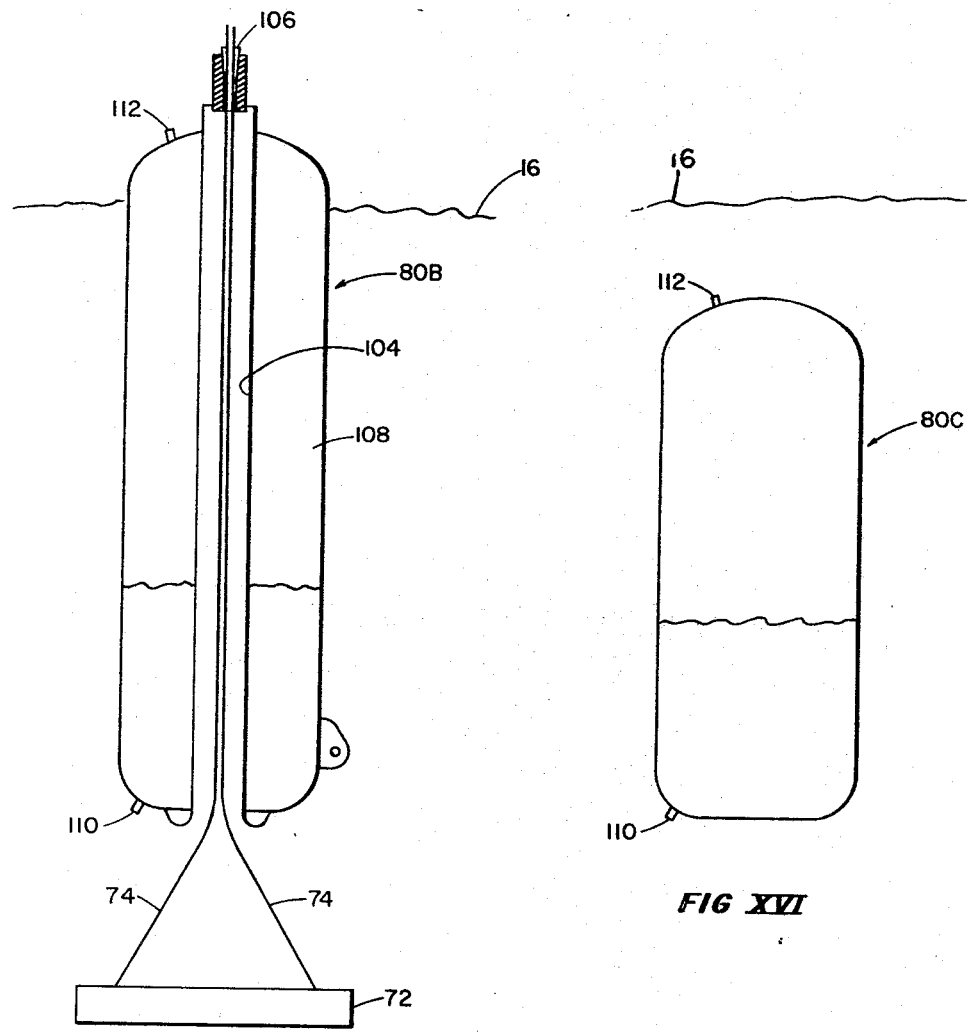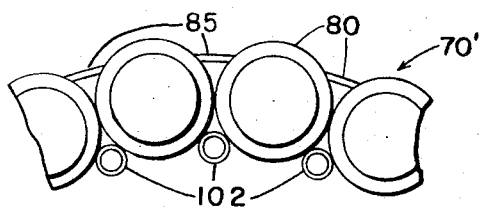

June 27, 1967  W. F. MANNING  3,327,667
MOORED PRODUCTION-STORAGE TANK
Filed April 28, 1965  6 Sheets-Sheet 6
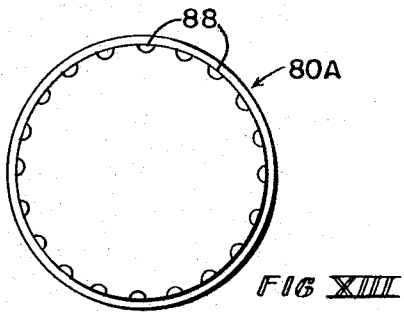
FIG XIII
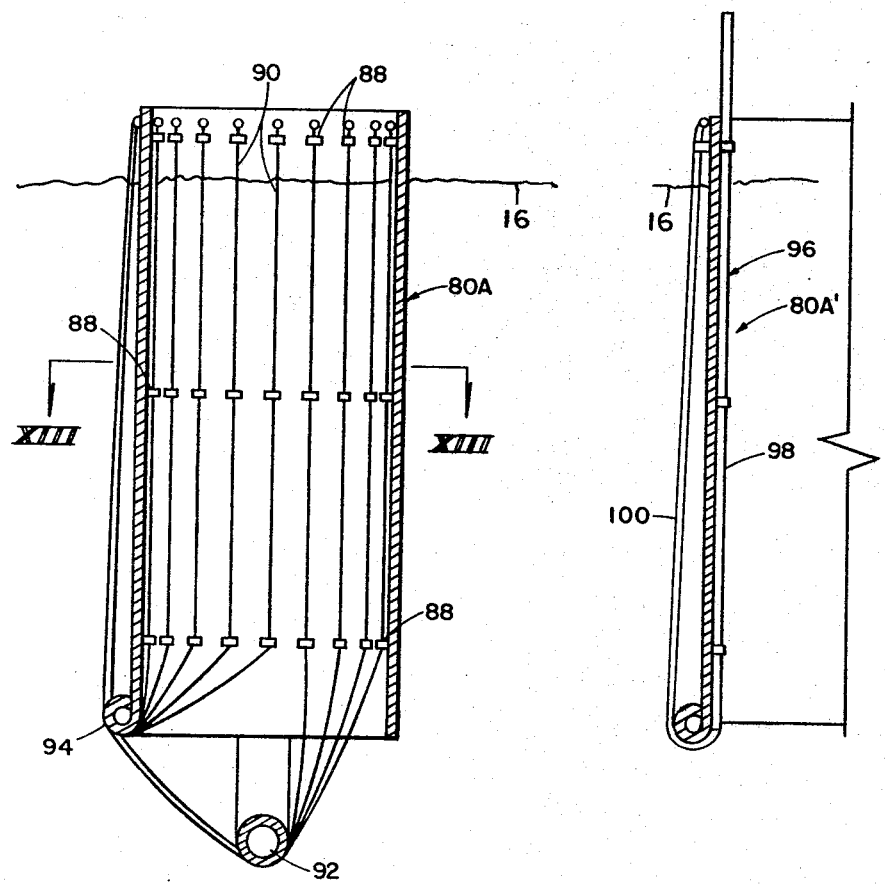
FIG XII
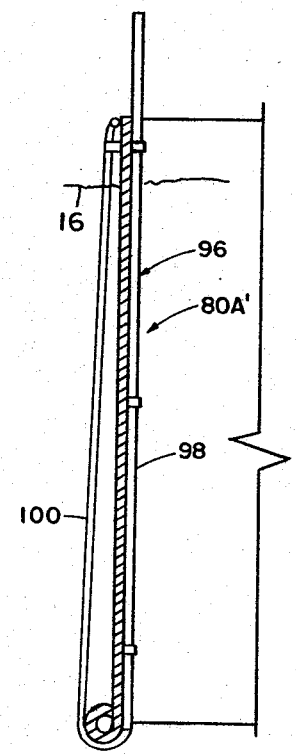
FIG XIV
INVENTOR.
WILLIAM F. MANNING
ALAN PAUL
ATTORNEY.

United States Patent Office 3,327,667
Patented June 27, 1967

3,327,667
MOORED PRODUCTION-STORAGE TANK
William F. Manning, Springdale, Conn., assignor to Mobil Oil Corporation, a corporation of New York
Filed Apr. 28, 1965, Ser. No. 451,398
21 Claims. (Cl. 114—.5)

The invention relates to devices for the marine storage of fluids, particularly those having specific gravities differing from that of water, specifically crude oil and petroleum fractions; and to methods for transporting the storage devices to locations at sea or in any other large body of water where such storage is needed, and for assembling and mooring the storage devices there. More particularly, the invention relates to storage devices or tanks which may be utilized at sea for the storage or containment of crude oils in conjunction with marine or offshore oil production. The invention also relates to prefabricated storage tanks which may be easily towed to position over submerged oil outlets.

The offshore drilling of oil wells creates, in itself, many problems, not the least of which is that of storing the oil as it is obtained from the well and until it can be transported to a refinery by ship or overland. There is presently a great deal of activity in marine or offshore exploration for, and production of, crude oil and gas, with the promise of appreciable future increases. This activity, which originated in offshore areas such as the Gulf of Mexico and the coast of California, as well as in inland water bodies, has been generally found, in the past, in areas rather close to industrial sites and/or quite near refineries. In the last few years, the locations or sites of offshore drilling operations have progressed to such far-off areas as the west coast of Africa where no refineries are close by, large storage facilities are not already present on the adjacent land, and even if they were present, no large harbors exist for facilitating the approach of ocean-going vessels. The lack of nearby industrial areas to the offshore oil well sites, as well as a lack of harbors, has made it desirable to find some way to store the oil at sea near the production sites in easily fabricated structures. The alternative is to moor an oil tanker adjacent the well and let it become slowly filled with the crude oil being produced from the offshore wells. However, it is economically unfeasible to tie up a tanker for such a long period of time as would be necessary to fill it directly from the wells when only a relatively short time would be needed to load the tank from an already filled reservoir.

One problem with onshore storage, particularly in an enclosed area, is the constant danger of explosion due to the collection of gases vaporized from the oil. In onshore installations the gases evaporating from the crude oil must be vented, or some method must be found for applying pressure to the ilquid oil, for preventing vaporization. Any space left in an enclosed area or storage vessel above the level of the oil will permit the retention of these gases and allow them to mix with trapped air to form an explosive mixture.

Furthermore, it is more expensive to locate storage facilities onshore and have flow lines extending out to the well than it is to store the oil at the offshore production site. A partially submerged structure, or enclosure, used to store oil at an offshore production site can be much lighter and does not require as much structural strength since the internal pressure of the oil against the walls of the enclosure will be opposed by the water pressure on the outside of the enclosure walls. Due to the immiscible nature of oil in water, any space in such a storage enclosure, not filled with oil, can be filled with water to keep the differential pressures low.

Moored storage enclosures, or tanks, previously designed have been cumbersome. They have required extensive assembly times and have not been built with the idea that they might be moved from one production site to another. Furthermore, many of the marine storage tanks of the prior art do not provide adequate guide means and protection for the flow lines which, in the undersea completions of today, may extend 600 feet below the surface.

Accordingly, it is an object of this invention to provide a floating marine or offshore storage tank for hydrocarbons and other products.

It is another object of this invention to provide a prefabricated marine or offshore storage tank that may be easily towed to a production site and assembled in a short time.

It is a further object of the invention to provide a bottomless marine or offshore storage tank for the production and storage of crude oils and gas.

A still further object of the invention is to provide a floating marine or offshore storage tank having integral ballast and/or buoyancy chambers defining the walls thereof.

It is still another object of the invention to provide a marine or offshore storage tank having integral means for protecting the flow lines connecting the tank with the submerged oil outlets.

Other objects and advantages of the invention will become apparent from the following description and claims, and in the drawings in which:

FIGURE 1 is a pictorial view of a roofed, prefrabricated bottomless storage tank assembled and anchored at an offshore site;

FIGURE 1A is a top plan view of the storage tank of FIGURE 1, without the roof installed;

FIGURE 2 is a cross-sectional view of the storage tank of FIGURE 1A taken through line 2—2;

FIGURE 3 is a top plan view of the bottomless storage tank, prior to assembly, being transported by a tug to a position adjacent a submerged oil outlet;

FIGURE 4 is a top plan view of the prefrabricated storage tank of FIGURE 3 being assembled over the submerged oil outlet;

FIGURE 5 illustrates a floating storage tank in which the tank-defining vertical wall consists of a number of interconnected cylindrical tubes forming the central, substantially cylindrical, enclosed storage area;

FIGURE 6 is a side elevational view of the storage tank of FIGURE 5 illustrating an oil tanker moored thereto and loading with crude oil;

FIGURE 7 is a side elevational view of another embodiment of the storage tank of the present invention illustrating the towing of the storage tank by a tugboat to a point at which the crude oil is being produced from a submerged oil outlet.

FIGURE 8 is a side elevational view of the storage tank of FIGURE 7 showing the tank as ballasted into a vertical or fluid storage position;

FIGURE 9 is a side elevational view similar to that of FIGURE 8 wherein a pretensioning anchor mat has been set in place;

FIGURE 10 is a side elevational view of the storage tank of FIGURE 9 illustrating how flow lines may be laid on the ocean bottom without a diver and showing a production platform mounted on the upper end of the storage tank;

FIGURE 11 is a cross-sectional view of the storage tank of FIGURES 7–10, taken through line 11—11 of FIGURE 8, for illustrating in detail the construction of the multitubular wall;

FIGURE 11A is a partial view of a modification of the storage tank wall structure also taken through line 11—11 of FIGURE 8;

FIGURE 12 is a side elevational view, in section, of one of the wall-defining tubes, of FIGURE 11, functioning as a flow line housing;

FIGURE 13 is a cross-sectional view through line 13—13 of FIGURE 12 showing in detail the means for guiding and/or aligning the flow lines in the housing;

FIGURE 14 is a partial cross-sectional view of a modification of the tubular flow line housing of FIGURE 12;

FIGURE 15 is a side elevational view, in section, of one of the wall-defining tubes, of FIGURE 11, functioning as a ballast tank and a housing for the pretensioning lines; and FIGURE 16 is a side elevational view, in section, of one of the wall-defining tubes, of FIGURE 11, functioning solely as a ballast tank.

In accordance with the invention, a floating storage tank is fabricated from at least three hollow tanks or wall sections which are connected together in series to form an enclosure therebetween for holding oil. The hollow sections are also utilized as ballasting means for changing the orientation of the storage unit from one in which towing is relatively easy to one in which liquid storage is possible. The hollow wall sections serve the further function of buoyancy-ballast pontoons for regulating the height of the storage tank in the water during storage.

In accordance with one embodiment of the invention, a number of floatable, prefabricated, rectangular pontoon sections are connected end to end, in the direction of the longest dimension of each pontoon section, by articulated joints and are towed by a tugboat to a site at which the storage tank is to be erected. The interconnected pontoon sections are floated with the smallest dimension, the thickness of each section, being in the vertical direction, so that the bargelike train of pontoon sections floats with least possible draft. Upon reaching the site, a portion of each of the pontoon sections is flooded by removing a plug or opening a valve, and the whole train of pontoon section tips over so as to lie with the intermediate (width in tow) dimension of each in a vertical direction. Once the sections have been stabilized in this second position the tug moves in a circular path and, either by anchoring the last pontoon section and driving the first section, or with the help of a second tug, forces the leading edge of the first pontoon section into contact with the trailing edge of the last pontoon section so that they may be interconnected by an articulated joint, similar to that connecting the other pontoon sections, to form an enclosed polygon. At this point a rib structure can be erected, interconnecting the sections or the articulated joints, so as to form a rigid, equal angle, polygon; or the joints can each be fixed in the desired orientation by any convenient method, for example, welding. Particularly if a roof is needed, a rib structure may be used. Each rib may, by example, be connected at one end to each of the articulated joints between the adjacent sections and at the other end thereof to a central hub member within the interior of the polygon.

The storage area formed by the enclosed space within the polygon may now be filled with oil from the submerged oil outlet, the oil displacing the water within the storage area. Any heavy impurities or sediment brought up with the oil, of course, will settle out and drop to the ocean bottom allowing the enclosure to be an oil cleaning as well as a storage device. The height of the upper edge of the storage enclosure, above the water line, may be set to compensate for the particular wind and wave conditions at the site, by a buoyancy chamber in the upper portion of each of the pontoon sections, controlled by a self-contained pump in conjunction with a manifolding system connected to each of the sections for raising or lowering the pontoon sections simultaneously.

In accordance with this invention, an airtight roof may also be built over the entire enclosure, using the strengthening ribs as a framework therefor. Such a roof, enclosing the entire storage area and sealed to the enclosure defining sections, will prevent any evaporative losses from the oil and also help to prevent contamination of the stored material. If such a roof is used, automatic sensing means may be provided in conjunction with the pump for automatically filling and emptying the buoyancy portions of the hollow pontoon sections as the amount of oil in the interior of the storage device changes so as to hold the storage device at a constant height above the water level. If the water is polluted, and the oil would be affected thereby, a fluid-tight flooring, similar to the roof, may also be installed.

In accordance with another embodiment of the invention, for use in very deep water of 400 to 600 feet, the storage tank may comprise at least four long, tubular elements forming a substantially circular enclosure within which the crude oil can be stored. In such an instance the tubes themselves may be floated and individually towed to the site after which they are each ballasted into a vertical position and the adjacent tubes welded or riveted together so as to form an internal circular compartment, or they may be connected together by articulated joints, before towing, as in the first embodiment. Provisions may be made for mooring cleats and flow lines so that an oil tanker may be brought to the storage tank for loading. A large anchor mat, lying on the bottom, and connected to the tank by pretensioning lines, may hold the buoyant tank at the same position with relation to the bottom of the sea regardless of the amount of oil within the enclosure or an automatic ballasting system, as described with respect to the first embodiment, may be used. A large storage device such as this may also have a production deck built on the upper end thereof and provisions for containing the flow and pretensioning lines within the tubular elements defining the enclosure.

Referring now to the drawings, in particular FIGURES 1 and 2, a prefabricated storage tank, generally designated 10, is shown floating in a shallow bay or sea. The tank 10 consists of a series of airtight rectangular pontoon or bargelike sections 12 interconnected by hinge joints 14 to form a multisided polygon, in this instance an octagon. As shown in FIGURE 2, the tank 10 floats just slightly above the surface 16 of the water while the bottom of the storage tank 10 lies a distance above the sea bottom 18, to prevent it from grounding. A flow line 20, connected to a production platform (not shown), extends along the bottom of the sea and upwardly into the enclosed tank 10 for transporting the crude oil from the production platform to storage. A loading line 22, for moving the crude oil from the tank 10 to an oil tanker (not shown) moored nearby, also lies on the bottom with one end thereof extending upwardly into the tank 10 while the other end is held at the surface, outside the tank 10, by means of a buoy 24. The end of the loading line 22, extending into the tank 10, may merely be held within the stored oil, and a pump (not shown) aboard the tanker will provide the impetus for the oil to be transferred, or the loading line 22 may be connected to an oil pump (not shown) mounted within the walls of a pontoon section 12 or fixed to the side thereof, to transfer the oil from the storage tank 10 to the oil tanker.

As may be seen in the sectional view, FIGURE 2, each of the pontoon sections 12 is centrally divided by a separator 28 to form a lower and an upper chamber, 37 and 38, respectively, within the pontoon sections 12. The lower chamber 37 in each pontoon section 12 may have a port 30 in the lower edge thereof and an air bleeder line 32 extending from the uppermost point, just below the divider 28, to the upper edge of the pontoon section 12. By striking off removable caps from the bleeder lines 32 and the ports 30, water will be caused to enter the lower chambers 37 of the pontoon sections 12 by ports 30 while air leaves by the bleeder lines 32, filling the chambers 37 for reasons to be considered later.

FIGURE 3 shows a prefabricated tank 10 of the type being discussed in which the eight hollow pontoon sections 12 are strung out in a line and are interconnected by means of the hinges 14. The whole line of pontoon sections 12 can be towed through towlines 25 by a tugboat 26. When the tugboat 26 reaches the general area in which the storage tank 10 is to be utilized for oil storage, the entire line of pontoon sections 12 are ballasted, by filling the chambers 37 therein with water, as discussed above, to make them heavier on one side, therefore causing the entire line to tip over from the position shown in FIGURE 3 to the position shown in FIGURE 4. As shown in FIGURE 4, the tug 26 then starts traveling in a circular path causing the pontoon sections 12 to follow and form the octagon. A second tug (not shown) may be used in conjunction with tug 26 to bring the two ends of the line of pontoon sections 12 tightly together so that they may be connected in the same manner as the other adjacent pontoon sections 12. Rather than using a second tug 26, one end of the line of pontoon sections 12 may be anchored.

After the pontoon sections 12 have been tipped over and formed into a closed polygon, with the ends thereof connected by a final hinge 14, a network of ribs 34 is erected between the hinges 14 and a central hub 36, which acts as a central joint or support for the ribs 34. The central hub 36 may be buoyant, or the rib structure can be triangulated to hold it in its vertical position. The hub 36 and rib structure 34 act to stabilize the geometrical shape and to provide a framework for a roof (not shown) which may be placed over the storage tank 10. It may be necessary, on occasion, to coat the hinges 14 with a sealant after tthe tank 10 has been set up so that there will be no oil leakage to the waters outside. Another method of preventing leaks is to weld or cement a flexible sheet of material to the inner faces of adjacent pontoon sections across the hinge 14, extending from the top to the bottom of the tank 10, so as to negate the need for a watertight hinge.

After the erection of the storage tank 10, oil may be pumped in through the open bottom by the flow line 20, and since oil is lighter than water, it will rise to th surface, the water being displaced out through the open bottom. The upper buoyancy chamber 38 in each pontoon section 12 is filled to the proper level with water or oil to permit the tank to float at a desired height above the water level. If a roof is provided over the storage tank 10 to prevent evaporation of the oil, the displacing of the water with oil within the tank 10 may cause the storage tank 10 to lift up out of the water as the amount of oil within the tank 10 increases. When this is the case, an automatic pump 40 (FIGURES 1A and 2) may be mounted on one of the pontoon sections 12 in conjunction with a pair of minimum and maximum level sensers 42 and 44, respectively, to pump air into the chambers 38 and vent water when the tank 10 sinks too low or to vent the air and let water into the chambers 38 when the tank 10 rises too high. The pump 40 is connected to each of the pontoon sections 12 by means of a flexible manifold 46 so that the water level in each of the buoyancy or flotation chambers 38 is equal. To moor the tank 10, a number of anchors 47, connected to the tank 10 by anchor lines 49, may be set in the bottom 18 of the body of water, the anchor lines 49 being long enough not to restrain unduly neither the up and down nor the horizontal oscillatory movement of the tank 10.

Shown in FIGURES 1A and 2 are the approximate design dimensions of the tank 10 with respect to its position, above the bottom 18 of the body of water and above the surface 16 of the water, when assuming a particular depth of water. Assuming a depth "$d$" of water, the distance from the lower edge of the tank 10 to the bottom should be a minimum of $0.15d$ to provide enough clearance so that tides and other phenomena cannot cause bottoming of the tank 10 and the attendant crimping of the flow lines 20. A similar safety margin should be left between the bottom of the tank 10 and the bottom of the oil stored so that the oil will not wash out across the lower ends of the pontoon sections 12. To compensate for waves, at least $0.2d$ should be left between the surface 16 and the top of the tank 10. Therefore, the total height of the tank 10 would be:

$$d - 0.15d + 0.2d$$

or $$1.05d$$

The maximum depth of the oil in the tank 10 would be:

$$1.05d - 0.15d$$

or $$0.9d$$

If the tank 10 were designed for a depth of water of 70 feet, the resulting height of the tank 10 would be $1.05d$ or 73.5 feet, extending $0.2d$ or 14 feet above the surface of the water, and lying $0.15d$ or 10.5 feet above the bottom 18. The minimum distance from the bottom 18 of the body of water to the oil-water interface would be approximately $0.3d$ or 21 feet while the still depth of the oil within the storage tank 10 would be a maximum of $0.9d$ or 63 feet. Assuming a practical oil storage depth limit of 60 feet, the following values for the dimensions of the storage tanks 10 for different storage capacities would be:

TABLE A

| Vol. stored in Bbls.×10³ (N) | (1) $R_1$ | (2) $D_2$ | (3) $L$ |
|---|---|---|---|
| 250 | 84 | 188 | 78 |
| 500 | 118.8 | 257.6 | 116.8 |
| 750 | 145.8 | 311.6 | 129 |
| 1,000 | 168 | 356 | 147.7 |
| 1,250 | 188 | 396 | 164.1 |
| 1,500 | 206 | 432 | 179.2 |

The following is an example of the calculations necessary to arrive at the dimensions shown in the above Table A:

$N$ = No. bbls. of oil designed to be stored
$A$ = area of oil storage in sq. ft.
$d'$ = depth of oil in ft.
$\phi$ = angle between a line through the center and normal to a side of the pontoon section 12 and a line through the center and a joint 14
$R_1$ = distance from center of polygon to the inner face of pontoon section 12
$D_2$ = mean diameter of the storage tank 10 in ft. (a diametrical line between the center lines of opposed tank sections 12 and normal thereto)
$L$ = length of a tank section 12
$n$ = No. of sides of the polygon
$C$ = constant = 5.6147 cu. ft./bbl. of oil
$A = nR_1^2 \tan \phi$ $$R_1 = \sqrt{\frac{A}{n \tan \phi}} = \sqrt{\frac{CN}{d'n \tan \phi}}$$

Assume 20 ft. thickness for each tank section 12.

For a storage capacity of $250 \times 10^3$ bbls.:

$$R_1 = \sqrt{\frac{5.6147 \times 250 \times 10^3}{60 \times 8 \times \tan 22.5°}} = 84$$

(1) The radius of the storage tank 10 measured to an inner face of pontoon section 12 is 84 ft.

$$D_2 = 2R_1 + 20$$
$$= 2(84) + 20 = 188$$

(2) The mean diameter of the storage tank 10 is 188 ft.

$L = D_2 \tan \phi$
$L = 188 \tan 22.5° = 188(.41421) = 78$ (3) The length of each tank section is 78 feet.

Several other dimensions of interest may be ascertained for the exemplified storage tank 10 of the preceding Table A:

Each pontoon section 12 is $78 \times 73.5 \times 20$.

When the tank 10 is towed in a disassembled, flat condition, it displaces the following surface area:

$$8L \times 1.05d$$

or $$624' \times 73.5'$$

The draft of the towed disassembled tank 10 is less than 20′.

FIGURES 5 and 6 illustrate a prefabricated tank, generally designated 48, which consists of a large number of hollow, buoyant tubes 50 connected together to form a rigid structure having a cylindrical interior compartment 51 designed for the storage of oil at sea. The tubes 50 making up the storage tank 48 may be individually towed to the site before assembly, and welded together at the site; or the storage tank 48 may be partially assembled by articulated joints between the tubes 50 before being towed, as was the case with the storage tank 10 of FIGURES 1–4; or the tank 48 may be completely fabricated ashore before being towed to the site. The tank 48, while shown composed of a number of tubes 50, could be formed of a double hull construction, similar to that used in ships; the individual tubes being formed by radial dividers separating the annulus between the hulls into separate compartments (not shown). Such a tank 48 is a rigid structure and is particularly adapted for use in rough, deep water where the tubes 50 may extend down from 150 feet to more than 300 feet beneath the surface to help stabilize the floating storage structure as well as to provide for the storage of a large volume of oil. The tank 48 will have an airtight roof (not shown) to keep the height of the tank 48, above water, from being very great. The tank 48 may also have a watertight flooring (not shown) if water polution is a problem.

The storage tank 48 is moored by four anchors 52, each one connected by an anchor line 54 to a corner of a square "spread" frame 56, attached to the tank 48 near the bottom thereof. The anchors 52 are each located, so that they can be raised when the tank 48 is to be moved, by means of a buoy 62 connected to the anchor 52 by a locating guide line 64. Above the surface 16 of the water, a number of mooring cleats 58 are welded to the outside of the tank 48 so that one or more ocean-going tankers 60 may be moored to the storage tank 48 at one time for taking on oil. As shown in FIGURE 6, a loading line 66 extends from the interior 51 of the upper end of the tank 48 so that oil may be pumped into the tanker 60 for transport; and a flow line 68 extends along the bottom 18 from a production platform (not shown) into the lower end of the tank 48 to permit the tank 48 to receive the oil that is being pumped out of a completed well. With the tubes 50 forming an interior compartment 30 feet in diameter and each tube being 150 feet long, the capacity of the storage tank 48 would be approximately 20,000 barrels.

FIGURES 7–11 show a further embodiment of the invention in which a storage tank, generally designated 70, designed for use in very deep water, in excess of 450 feet, is preferably prefabricated ashore from a number of long, hollow, tubes 80 to form the storage tank 70, similar in general design to that of FIGURES 5 and 6. The storage tank 70 is towed, in a buoyant condition, by a tugboat 26 to the site at which it will be erected. As previously mentioned, the tubes 80 can be connected by articulated joints and towed out to the site in a manner similar to that illustrated in FIGURE 3 in conjunction with the first embodiment of the invention. Alternatively, the tubes 80 can be rigidly connected as by welding to form the storage tank 70 which is then towed on its side as shown in FIGURE 7. When the tank 70, of FIGURE 7, reaches the erection site, buoyancy-ballast tanks (to be described later) consisting of a number of the tubes 80, at one end of the tank 70, are partially filled with water to ballast the tank into the vertical position shown in FIGURE 8. Subsequently, as shown in FIGURE 9, an up-current anchor 76 is attached and set. Then an anchor mat 72, detachably mounted on one side of the tank 70, is unhooked therefrom so that the mat 72 may drop to the bottom 18. Grout or some other heavy material is directed through means (not shown) to fill the anchor mat 72. With the use of pretensioning lines 74, connected to the anchor mat 72 to hold the tank 70 at a constant distance above the bottom 18 of the sea, some of the tubes 80, functioning as buoyancy tanks, are partially emptied of water. Several more anchors 76 may also be connected by anchor lines 78 to the tank 70 to prevent lateral shifting of the tank 70 with respect to the bottom 18. A production deck 82 may now be installed on the top of the storage tank 70 if it is so desired.

A number of the vertical tubes 80, forming the circumference of the storage tank 70, may extend above the upper surface of the storage tank 70 to provide a base for the production deck 82 mounted thereon or a separate superstructure may be designed to hold the deck 82 above the tank 70. As shown, the top of the tank 70 is beneath the surface 16 of the sea and therefore a roof (not shown) is required. A floor (not shown) may also be used if the conditions previously discussed require it.

The cross section of the tank 70 as shown in FIGURES 11, 12–15, and the following Table B illustrate the different types of peripheral tubes 80 (80A, 80B, 80C) used to define the storage area 84 of the tank 70 as designed for use in water depths of 600 feet:

TABLE B

| Tube Designation | No. Required | Low Elevation [1] | High Elevation [1] | Use | Structure |
| --- | --- | --- | --- | --- | --- |
| 80A (Figs. 11, 13 and 14) | 4 | −500 | +60 | Flow line riser housing | Open both ends. |
| 80B (Figs. 11 and 15) | 8 | −500 | +10 | Pretensioning line and ballast | Sealed at both ends except for line passages. |
| 80C (Figs. 11 and 16) | 8 | −500 | −50 | Ballast | Sealed at both ends. |
| 84 (Fig. 11) | 1 | −500 | −50 | Storage | Sealed at least at top. |

[1] Measured from water line.

The erected tank 70 to the lower edge of the production deck structure 82 measures 560 feet, from a point 500 feet below the surface of the water to a point 60 feet above the surface. All of the tubes 80 are 60 inches outside diameter and may be welded together to form the rigid frame by means of parallel pairs of plates 85, each 12-inch wide by ¾-inch thick (FIGURE 11). A roof (not shown) extends across the storage chamber 84 fifty feet below the surface and is sealed to all of the tubes 80A, 80B, and 80C. The twenty tubes 80, each 60 inches in diameter, would form a storage enclosure 84 on a 32-foot circle. This would provide a circular storage enclosure having a diameter of approximately 29 feet and an area of 662 square feet. With the enclosure 84 being 450 feet in length, it could hold 297,800 cubic feet or 50×10³ barrels of oil.

The open tubes 80A (as shown in FIGURES 11, 12 and 13) extend from the low elevation of the tank storage enclosure 84 to the production deck 82 (FIGURE 10) and are each adapted to hold twenty flow lines such as the flow lines 86 shown in FIGURE 10. Since there are four of these tubes 80A, which act as flow line riser housings, one storage tank 70 is able to service eighty submerged wells (not shown). Each of the tubular housings 80A has guide means for equally spacing twenty flow lines 86 around the inner surface thereof. In the particular structure shown in FIGURE 13, the guide means consist of three levels of guide loops 88.

A plurality of guide ropes 90 (FIGURE 12) are each fastened at one end within the upper end of the housing 80A, at equally spaced intervals, and are threaded sequentially through the several levels of guide loops 88, out of the open lower end of the housing 80A on bumpers 92 and/or 94 and up the outside of the housing 80A, in a compact group or bundle, the guide ropes 90 being fastened to the outer wall at the top thereof. The bumpers 92 and 94 are provided to prevent the guide ropes 90 from rubbing along the lower metal edges of the storage tank 70. The bumper 92, in particular, is provided to prevent the rubbing between the guide ropes 90, furthest from the bumper 94, and the lowest level of guide loops 88 through which they must slide. If a specific flow line 86 is needed, the end of the appropriate rope 90 is unfastened from the outer wall of the housing 80A and is connected to a free end of the flexible flow line 86. The end of the rope 90 fastened within the housing 80A, where it can be reached from the production deck 82, is unfastened and is then connected to a winch (not shown) to pull the flexible flow line 86 down the outer wall of the housing 80A and up the inner wall, through the loops 88, without need for a diver. The flow line 86 is played out from the deck of a ship 93, as the ship 93 moves away from the storage tank 70 so that the flow line 86 is extended along the bottom 18 of the body of water as shown at 86′ (FIGURE 10) toward a submerged production wellhead of a completed well. If a flow line section (not shown) coupled to the oil outlet of a submerged production wellhead has its free end connected to a buoy (not shown) at the time of the installation of the wellhead, the end of the flow line 86 can be connected to the flow line section at the surface and then dropped to the bottom. Therefore, it is possible to interconnect the storage tank 70 to numerous wells without using the services of a diver.

FIGURE 14 illustrates a modification of the tubular housing 80A of FIGURE 12 wherein short composite flow lines, generally designated 96, are permanently mounted on the housing 80A′. Each flow line 96 consists of a rigid metal pipe 98 fastened to the inner wall of the housing 80A′ and extending out of the upper end thereof toward the production deck 82. The lower end of the pipe 98 extends to the bottom of the housing 80A′ where it is connected to one end of a short flexible flow line 100. The short flow line 100 extends up the outside of the housing 80A′ and is removably fastened to the outer wall thereof above the surface 16 of the water. The upper end of each flow line 100 is adapted to be connected to a long flow line 86 played out from a ship 93 (as shown in FIGURE 10) after being unfastened from the housing 80A′. The combined line 100, 86 can then be laid along the sea bottom 18 to a completed well as was done with the embodiment of FIGURE 12.

FIGURE 11A shows a modified tank 70′, of particular utility when the storage tank 70′ need service less wells than those contemplated to be serviced by storage tank 70. The continuous inner wall defining the storage enclosure 84 is not formed by plates 85 welded or riveted between adjacent tubes 80, but by a section of 6⅝″ O.D. continuous tubing 102 welded between each adjacent pair of the tubes 80 forming a substantially circular inner wall of the enclosure 84. The tubing 102 serves the double function of (1) sealing the area between the adjacent 26-inch tubes 80, and (2) forming rigid inner flow lines which negate the need for the separate rigid flow lines 98 and the accompanying mounting structure in the housings 80A (FIGURE 14).

FIGURE 15 shows one of the eight closed-end pretensioning and ballast tubes 80B. The closed tubes 80B, each has an open central cylindrical passage 104 extending the length thereof for the pretensioning lines 74 connected to the anchor mat 72. The lines 74 are held in the tensioned condition after the anchor mat 72 has been set, by a set of slip jacks 106 mounted in the upper end of the central passage 104 above the surface of the water. The annulus between the outer tube 80B and the walls of the inner passage 104 forms a buoyancy-ballast chamber 108. The chamber 108 may be subdivided in the vertical direction so that different portions can be flooded at the option of the operator for changing the orientation of the storage tank 70 from the horizontal towing position (FIGURE 7) to the vertical storage position (FIGURES 8–10). A port 110 for pumping in or expelling water is shown fixed in the bottom of the buoyancy-ballast chamber 108 while a port 112 for venting air is fixed in the upper end.

FIGURE 16 shows one of the closed-ended buoyancy-ballast tubes 80C. This tube also has a water port 110 and an air port 112. As in the pretensioning and buoyancy-ballast tubes 80B, the tubes 80C may be vertically partitioned for selective filling.

The tank 70 may be held at a constant height above the water line by an automatic ballasting system which would pump water into, and air out of, the tubes 80B and 80C as oil is pumped into the central storage enclosure 84, as explained with respect to previously discussed embodiments. With an automatic ballasting system, the anchor mat 72 would not be necessary and all of the pretensioning and buoyancy-ballast tubes 80B could be replaced by simple buoyancy-ballast tubes such as tubes 80C. When automatic ballasting is used in place of pretensioning it is almost mandatory that the storage tank 70 pierce the water surface 16, otherwise the draft would change too sharply under small changes in weight on the production deck 82. The buoyancy-ballast tubes 80C would then necessarily be extended above the surface 16, as they could be, in any case, if more storage area were needed.

Although the present invention has been described in connection with details of specific embodiments thereof, it is to be understood that such details are not intended to limit the scope of the invention. The terms and expressions employed are also used in a descriptive and not a limiting sense, and there is no intention of excluding such equivalents in the invention described as fall within the scope of the claims. Now having described the method and apparatus herein disclosed, reference should be had to the claims which follow.

What is claimed is:

1. A floating marine storage device for the containment of a discrete fluid within a body of water comprising; at least three individual hollow sections, means for connecting said hollow sections together to define a continuous fluid-tight wall of an enclosure for the storage of said fluid to a substantial depth, a roof extending over said enclosure; and means for utilizing said individual hollow sections as integral ballast and buoyancy tanks for said storage device.

2. The marine storage device of claim 1 wherein each of said hollow sections is a generally rectangular pontoon and said storage enclosure is of a generally polygonal shape.

3. The marine storage device of claim 1 wherein said connecting means comprise articulated joints between adjacent hollow sections.

4. The marine storage device of claim 1 wherein each of said hollow sections is a cylindrical tube.

5. A floating marine storage device for the containment of fluids lighter than water, within a body of water, comprising; at least three individual hollow sections, articulated joints between adjacent hollow sections for connecting said sections together to form a continuous, substantially fluid-tight wall defining a storage enclosure, and substantially rigid stiffening means interconnected between nonadjacent of said articulated joints across said storage enclosure whereby said storage enclosure formed by said hollow sections is held in a definite shape.

6. The floating marine storage device of claim 5 wherein said stiffening means comprises a hub element and at least two rigid rod elements, said hub element floating in the center of said enclosure and each of said rigid rod elements fixed by one end thereof to an articulated joint and by the other end thereof to said floating hub.

7. In the floating marine storage device of claim 6, a roof structure substantially covering said enclosure, means for supporting said roof over said enclosure, said stiffening means being at least a portion of said supporting means for said roof.

8. A method for transporting a marine storage device to a crude oil production site in a body of water and for assembling said device at said site, wherein said device comprises at least three hollow airtight sections, port means for selectively filling with water, or emptying of water, each of said hollow sections, said hollow sections each being adapted to be connected together, and articulated joints for connecting adjacent hollow sections, whereby the angular relationship between adjacent hollow sections can be changed when the hollow sections are connected together; comprising the following steps:
 (a) connecting said hollow sections, in a line, by one of said articulated joints between each pair of adjacent sections, the sections at the ends of said line each having a free end;
 (b) filling said hollow sections with air so that each will float in water;
 (c) floating said line of sections with the smallest dimension of each section being perpendicular to the surface of the water and said axes of rotation of all of the articulated joints lying approximately in a plane parallel to the surface of the water;
 (d) propelling said line of sections to said site;
 (e) at said site, filling at least a portion of each section with water to ballast said line of sections over on its side to a position in which each of said sections is floating at approximately the same height in the water, and the axis of each articulated joint is substantially perpendicular to the surface of said water;
 (f) holding said free end of a section at one end of said line of sections, while moving said free end of the section at the other end of said line of sections, in a substantially circular path until said free ends of the sections, at said ends of said line of sections, are adjacent each other; and
 (g) connecting, with one of said articulated joints, the free end of said section at one end of said line of sections to said adjacent free end of said section at the other end of said line of sections to form an enclosure within the connected sections.

9. The method of claim 8 comprising the following additional step:
 (h) mounting a rib assembly between said articulated joints to stiffen said enclosure in a definite shape.

10. The method of claim 8 wherein there is provided a flexible manifold adapted to be connected to each of said sections for the simultaneous filling and emptying of said hollow sections; comprising the following step, preferably to be completed before step (b):
 (i) connecting said flexible manifold to each of said hollow sections so that said sections can be simultaneously filled or emptied.

11. A method for transporting a marine storage device to a crude oil production site in a body of water on its side and for uprighting said device at said site, wherein said device comprises at least three long hollow airtight sections rigidly connected together to define an enclosure of a fixed shape for containing a fluid therein when said storage device is uprighted, means for selectively filling with water, or emptying of water, each of said hollow sections, said storage device being so proportioned that the horizontal distance across said enclosure is small with respect to the longitudinal dimension of each of said sections, and said longitudinal dimension of each section being perpendicular to the surface of said body of water when said storage device is uprighted; comprising the following steps:
 (a) filling said hollow sections with air so that said storage device will float on its side in said body of water with said longitudinal dimension of each of said sections being substantially parallel to said surface of said body of water;
 (b) towing said storage device to said site while said device is floating on its side in said body of water; and
 (c) ballasting said sections, upon reaching said site, so as to change the orientation of said storage device to an upright position in which said longitudinal dimension of each of said sections is perpendicular to said surface of said water and said enclosure is at least partially submerged.

12. A method for transporting a marine storage device to a crude oil production site in a body of water on its side and for assembling said device in an upright position at said site, wherein said device comprises at least three long hollow airtight sections connected together to define an enclosure when said storage device is assembled and uprighted, means for selectively filling with water, or emptying of water, each of said hollow sections, the horizontal distance across said enclosure being small with respect to the longitudinal dimension of each of said sections, said longitudinal dimension of each section being perpendicular to the surface of said body of water when said storage device is assembled and uprighted, and said enclosure being of a fixed shape for containing a fluid therein; comprising the following steps:
 (a) filling each of said hollow sections with air so that each of said sections will float on its side in said body of water with said longitudinal dimension of each of said sections being parallel to the surface of said body of water;
 (b) towing each of said hollow sections to said site while floating in said body of water;
 (c) ballasting each of said sections, upon reaching said site, so as to change the orientation thereof to said upright position in which said longitudinal dimension of each of said sections is perpendicular to said surface of said body of water; and
 (d) assembling said storage device, including connecting all of said hollow sections together to define a storage enclosure therewithin.

13. The method of claim 12 comprising the following additional step:
 (e) mounting a production deck on the upper ends of said hollow sections defining said storage enclosure, said production deck being above said surface of said water.

14. The method of claim 12 wherein the assembling step (d) includes rigidly connecting said hollow sections.

15. The method of claim 12 wherein the assembling step (d) includes welding adjacent hollow sections together to form a rigid connection.

16. A floating marine storage device for the containment of fluids lighter than water, within a body of water, comprising; at least three individual hollow sections connected together to form a continuous, substantially fluid-tight wall defining a storage enclosure, the means for connecting said sections together being, at least in part, open tubes, one fixed between each pair of adjacent sections within said storage enclosure and extending the length of said storage enclosure whereby each of said tubes provides a passage from the top to the bottom of said enclosure so that each connecting open tube may act as a portion of a flow line, through said storage enclosure, extending from a submerged well served by said storage device to a production deck mounted above said enclosure.

17. The marine storage device of claim 16 wherein each of said sections defining said enclosure, and each of said flow line tubes is a cylindrical tube, the diameter of each of said flow line tubes, forming a part of the connection between adjacent cylindrical tubes, being small with respect to the diameter of each of said cylindrical tube sections, defining the enclosure, whereby the enclosure has a substantially regular inner wall.

18. The marine storage device of claim 17 wherein said means for connecting said sections together comprises, in part, plate elements rigidly fixed between each pair of adjacent sections and extending the length of said sections to form therewith a substantially regular outer wall of said storage enclosure.

19. A floating marine storage device for the containment of fluid lighter than water, within a body of water, comprising; at least three individual hollow sections, said hollow sections forming at least first, second, and third groups of cylindrical tubes; each tube of said first group of cylindrical tubes being open at both ends and serving to house flow lines; each tube of said second group of cylindrical tubes being closed at both ends and having an open passage extending longitudinally therethrough, an enclosed annulus formed between each tube of said second group of cylindrical tubes and the respective longitudinal passage extending therethrough, said annulus serving as a ballasting chamber, and said passage therethrough serving as a housing for pretensioning lines connected to an anchor mat to be set on the bottom of said body of water; each tube of said third group of cylindrical tubes being completely closed at both ends and serving as a ballasting chamber; and means connecting said sections together to form a continuous, substantially fluid-tight wall defining a storage enclosure.

20. The marine storage device of claim 19 wherein each tube of said first, second, and third groups of cylindrical tubes, comprising said hollow sections, are denoted as A, B, and C, respectively, and said tubes are connected to form said enclosure in a repetitive pattern in series of "A, B, C, C, B."

21. The marine storage device of claim 19 wherein means are fixed within at least one of said tubes of said first group of cylindrical tubes to guide at least a pair of parallel ropes down the inner face, across the bottom edge, and up the outer face, of said one of said tubes of said first group of cylindrical tubes; means adjacent the upper end of said one of said tubes of said first group of cylindrical tubes for holding the ends of said rope near the top of the one of said tubes of said first group of cylindrical tubes whereby the end of one of said ropes outside said one of said tubes of said first group of cylindrical tubes can be released from the holding means and can be instead attached to a flow line to draw said flow line down to the bottom of said one of said tubes of said first group of cylindrical tubes and up through said one of said tubes of said first group of cylindrical tubes within said guide means without a diver when said storage device is floating in said body of water with the lower end of said one of said tubes of said first group of cylindrical tubes being considerably below the surface of said body of water.

References Cited

UNITED STATES PATENTS

| | | | |
|---|---|---|---|
| 2,682,151 | 6/1954 | Simpson et al. | 114—0.5 |
| 2,939,290 | 6/1960 | Crake | 61—46.5 |
| 3,080,583 | 3/1963 | Fuller | 114—0.5 |
| 3,146,598 | 9/1964 | Smith | 114—0.5 |

MILTON BUCHLER, *Primary Examiner.*

T. M. BLIX, *Assistant Examiner.*